United States Patent Office 3,065,203
Patented Nov. 20, 1962

3,065,203
POLYSILOXANE STABILIZATION
Leonard B. Bruner, Madison, Wis., assignor to Dow Corning Corporation, Midland, Mich., a corporation of Michigan
No Drawing. Filed Feb. 8, 1960, Ser. No. 7,120
2 Claims. (Cl. 260—46.5)

This invention relates to stabilization of alkaline diorganopolysiloxanes by neutralization of the alkaline polymerization catalyst with an alpha chlorhydrin.

One of the current methods of preparing diorganosiloxanes polymers is the heating of diorganosilane hydrolyzates and cyclodiorganopolysiloxanes, preferably cyclic trimers, with alkali metal catalysts such as alkali metal hydroxides, e.g. lithium hydroxide, potassium hydroxide, sodium hydroxide or cesium hydroxide, or the low molecular weight silanolate salts of these hydroxides, e.g. $KOSi(CH_3)_2OSi(CH_3)_2OK$ or $(CH_3)_3SiONa$. These alkali metal compounds are extremely effective siloxane bond-rearranging catalysts. Any such polymerization system contains some type of linear-cyclic equilibrium. Consequently there are always some cyclic materials present in the final polymerization product. Since these cyclic materials are not generally reactive, it is usually desirable to remove them from this product. This is most easily done by heating the product under a vacuum or in an air-circulating oven. However, this heat devolatization causes further polymerization activity in that removal of the cyclic materials affects the linear-cyclic equilibrium, and some of the linear polymers are converted to cyclic polymers which are in turn removed. In order to stabilize the system to prevent this gradual loss of product during devolatilization it is necessary to neutralize the catalyst.

Several methods have been used in the past to neutralize the catalyst. One method involves the use of various organophosphorus compounds. Another employs iodine. Another employs chlorosilanes or HCl, but these must be added only in sufficient quantity to effectively neutralize the alkaline catalyst without degrading the linear polymers. A fourth method employs minute amounts of silica, but the presence of silica causes some crepe hardening. Silica is especially undesirable where the final product must have, for example, special optical properties. Another method used with fluid polymers employs a dilute aqueous acid wash followed by a water wash, but this method is cumbersome.

The primary object of this invention is to provide a method of stabilizing all alkali metal catalyzed diorganopolysiloxanes by neutralizing the alkali metal catalyst. The second object of this invention is to provide such a method in which the neutralizing agent can be used in excess without adversely affecting the final product. The third object of this invention is to provide such a method which can be employed easily in conjunction with the devolatilization of the polymers produced. All these objects are satisfied by this invention.

This invention relates to a method for stabilizing an alkali metal catalyzed diorganopolysiloxane which consists essentially of (1) mixing with said diorganopolysiloxane an alpha chlorhydrin of no more than three carbon atoms in an amount equal to at least one chlorine atom per alkali metal atom in said diorganopolysiloxane and (2) heating the mixture at a temperature and for a time sufficient to remove volatile materials.

All of the materials employed in this invention are well known in the art.

The alkaline "diorganopolysiloxane" to be stabilized is any diorganopolysiloxane prepared with any of the alkali metal catalysts such as those mentioned above. There can be up to 1 mol percent of monoorganosiloxane and $SiO_2$ units in the polymer, but preferably less than 0.1 mol percent of these poly-functional units are present. Triorganosiloxane units can also be present in amounts up to 1 mol percent and are especially useful where one of the organic radicals is an alkenyl radical.

Generally, the organic radicals attached to the silicon atoms are monovalent hydrocarbon radicals or halogenated monovalent hydrocarbon radicals. More specifically the organic radicals can be, for example, any alkyl radical such as the methyl, ethyl, isopropyl, tert-butyl, 2-ethylhexyl, dodecyl, octadecyl and myricyl radicals; any alkenyl radical such as the vinyl, allyl, decenyl and hexadienyl radicals; and cycloalkyl radical such as the cyclopentyl and cyclohexyl radicals; any cycloalkenyl radical such as the cyclopentenyl, cyclohexenyl and cyclo-2,4-hexadienyl radicals; any aryl radical such as the phenyl, naphthyl and xenyl radicals; any aralky radical such as the benzyl, phenylethyl and xylyl radicals and any alkaryl radicals such as the tolyl and dimethylphenyl radicals. These monovalent hydrocarbon radicals can be halogenated to give such radicals as the chloromethyl, 3,3,3-trifluoropropyl, 3,3,4,4,5,5,5-heptafluoropentyl, perchlorophenyl, 3,4-dibromocyclohexyl, $\alpha,\alpha,\alpha$-trifluorotolyl, 2,4-dibromobenzyl, difluoromonochlorovinyl, $\alpha,\beta,\beta$-trifluoro-$\alpha$-chlorocyclobutyl and 2-iodocyclopenten-3-yl radicals, all of which are operative. However, any diorganopolysiloxane which can be polymerized with an alkali metal catalyst is operative in the method of this invention.

The "alpha chlorhydrin of no more than three carbon atoms" includes any chlorhydrin in which a Cl and OH are attached to adjacent, i.e., alpha, carbon atoms, e.g. ethylene chlorhydrin $ClCH_2CH_2OH$, propylene chlorhydrin $CH_3CHOHCH_2Cl$, glycerol $\alpha$-monochlorhydrin $ClCH_2CHOHCH_2OH$ and glycerol $\alpha,\gamma$-dichlorhydrin $ClCH_2CHOHCH_2Cl$.

It is necesary for neutralization of the alkali metal catalyst to use at least enough alpha chlorhydrin to supply one chlorine atom for each alkali metal cation. Generally, the catalysts are used in an amount equal to a ratio of alkali metal atom to silicon atoms of at least 1:200,000, preferably between 1:20,000 and 1:2000. This means as little as 0.0005 part by weight of alpha chlorhydrin per 100 parts of polymer can be used under ideal conditions to neutralize the catalyst. As a practical matter for neutralizing these catalysts, however, there should be a large molar excess of the alpha chlorhydrin to insure complete neutralization in a reasonable time. Since the alpha chlorhydrin does not affect the siloxane polymers as such, a fifty-fold excess or more is not detrimental and generally amounts to no more than 1 to 2 parts by weight of the alpha chlorhydrin per 100 parts of polymer. However, 10 parts by weight or more of the alpha chlorhydrin can be employed if desired.

The alpha chlorhydrin is thoroughly mixed with the alkali metal catalyzed diorganopolysiloxane. The alpha chlorhydrin can be added, if desired, in solution in a solvent such as acetone, diethyl ether, benzene, toluene, heptane, butanol, dioxane, tetrahydrofuran and the like. Where the mixture is incompatible, heating for from 1 to 4 hours at temperatures up to 250° C., under pressure if desired, accelerates neutralization without extensive weight loss. After the mixing of the alpha chlorhydrin with the polymer is complete, the mixture is devolatilized by standard procedure, i.e. heating at from 100° C. to 250° C. in circulating air or a vacuum, until the unacceptable volatile materials including cyclics and excess alpha chlorhydrin are removed.

The method of this invention while effective for all alkali metal catalyzed diorganosiloxane polymers is particularly advantageous for the stabilization of polymers to be used in making glass laminates where optical clarity must be maintained.

The effectiveness of this invention is illustrated in the following examples. These examples show the best methods of practicing the invention but are not intended to limit this invention which is properly delineated in the claims.

*Example 1*

1000 rams of 3,3,3-trifluoropropylmethylpolysiloxane polymerized to a gum having a Williams plasticity of approximately 0.078 inch with NaOH in an amount approximately equivalent to one sodium atom per 5000 silicon atoms were mixed with 10 grams of ethylene chlorhydrin for one hour at room temperature. The mixture was subsequently heated for 166 hours at 150° C. in an air circulating oven. The weight loss was 1.7 percent of which at least 0.8 percent was excess ethylene chlorohydrin.

A sample of the above gum was heated at 150° C. in an air circulating oven without prior neutralization. After 144 hours the weight loss was 69.2 percent.

*Example 2*

100 parts by weight of a copolymer of 99.858 mol percent dimethylsiloxane units and 0.142 mol percent methylvinyl siloxane units polymerized to a gum having a Williams plasticity of approximately 0.060 inch with KOH in an amount approximately equivalent to one potassium atom per 5000 silicon atoms were mixed with 1 part by weight of ethylene chlorohydrin. The mixture was milled, heated for 3 hours at 200° C. to insure reaction and then heated for 24 hours at 250° C. in an air circulating oven. The weight loss was 6.18 percent.

A sample of the above gum was similarly heated without prior neutralization. The weight loss after 24 hours at 250° C. was 99.5 percent.

*Example 3*

When a phenylmethylpolysiloxane polymerized to a gum having a Williams plasticity of 0.080 inch with $(C_6H_5)(CH_3)_2$ SiONa in an amount equivalent to one sodium atom per 4000 silicon atoms is substituted for the dimethylsiloxane-methylvinylsiloxane copolymer in Example 2, similar results are obtained.

*Example 4*

When 0.25, 0.50 and 1.0 part by weight of each of propylene chlorohydrin, glycerol α-monochlorohydrin and glycerol α,γ-dichlorhydrin are substituted for the 1 part by weight of ethylene chlorhydrin in Example 2, similar results are obtained.

That which is claimed is:

1. A method for stabilizing an alkali metal catalyzed diorganopolysiloxane which consists essentially of (1) neutralizing the alkaline polymerization catalyst by mixing with said diorganopolysiloxane an alpha chlorhydrin of no more than three carbon atoms in an amount equal to at least one chlorine atom per alkali metal atom in said diorganopolysiloxane and (2) heating the mixture at a temperature and for a time sufficient to remove volatile materials.

2. The method of claim 1 wherein step (2) takes place at a temperature between 100° C. and 250° C.

References Cited in the file of this patent

UNITED STATES PATENTS 2,650,934     Rust et al. _____ Sept. 1, 1953

UNITED STATES PATENT OFFICE
CERTIFICATE OF CORRECTION

Patent No. 3,065,203     November 20, 1962

Leonard B. Bruner

It is hereby certified that error appears in the above numbered patent requiring correction and that the said Letters Patent should read as corrected below.

Column 2, line 13, for "and" read -- any --.

Signed and sealed this 3rd day of December 1963.

(SEAL)
Attest:

ERNEST W. SWIDER

Attesting Officer

EDWIN L. REYNOLDS

Acting Commissioner of Patents